May 5, 1970 W. KLEIN 3,510,591

CONTROL FOR AN AUTOMATIC REVEILLE ALARM DEVICE IN TELEPHONE SYSTEMS

Filed June 1, 1966 3 Sheets-Sheet 1

May 5, 1970 W. KLEIN 3,510,591

CONTROL FOR AN AUTOMATIC REVEILLE ALARM DEVICE IN TELEPHONE SYSTEMS

Filed June 1, 1966 3 Sheets-Sheet 2

United States Patent Office 3,510,591

Patented May 5, 1970

3,510,591
CONTROL FOR AN AUTOMATIC REVEILLE ALARM DEVICE IN TELEPHONE SYSTEMS

Wolfgang Klein, Kornwestheim, Germany, assignor to International Standard Electric Corporation, New York, N.Y., a corporation of Delaware Filed June 1, 1966, Ser. No. 554,571
Claims priority, application Germany, June 3, 1965, St 23,924, St 23,925; June 6, 1965, St 24,091
Int. Cl. H04m 11/02
U.S. Cl. 179—2 5 Claims

ABSTRACT OF THE DISCLOSURE

An automatic morning and alarm call system is provided. By this system a subscriber is able, by dialling, to place a request for certain telephone services at a particular time. The times for all calls are recorded and pulses from a clock are used to determine when particular calls are to be made. Calls into and from the system are automatic to dispense with the need for a human operator.

The invention relates to control of an automatic alarm device in a telephone system in which reveille information items—subscriber calling number and time—are received via a storing facility, kept in a central program storage and the reveille alarm is initiated by a time comparing facility.

With the introduction of an automatic reveille alarm facility in telephone systems the subscriber himself has an opportunity to order a reveille in the central program storage of the system by dialling directly. This relieves the operators' positions of the need for making many routine calls. The central program storage controls, in cooperation with a time comparing facility, the initiation of the reveille alarm.

The orders for morning or alarm calls, as retained in the central program storage, are regularly compared with a time comparison device, and in the case of time coincidence the respective subscriber is called automatically. In this case the time is stated in coded form, and may be expressed in hour and minute statements. Usually, only time intervals of 5 or 10 minutes are chosen. The necessary timing rhythm is derived from a master or secondary clock. Reference may be made to a related patent application No. 554,396 to Kakuschke-Klein filed on June 1, 1966 and assigned to the same assignee as the present invention.

At each clock-produced pulse a time storage in the time comparison device is stepped-on, and the thus newly formed time information is compared with the time information stored in the program storage. Every order for a morning or alarm call being in time coincidence, is carried out in the manner known per se.

To enter a reveille order into the program storage, the subscriber or the operator first seizes a storage facility for receiving the reveille information and forwarding it to the central program storage. The reveille order is kept in the program storage until it is to be executed while the storing facility is again released to accept other reveille orders. When transferring into the program storage at first an available storage section must be found and determined, whether for said subscriber a reveille order is already given or not, the storing facility circuit remains seized until the program storage has been interrogated. This seizing period can be reduced in that all storage sections of the program storage are interrogated in parallel. This can only be accomplished with a considerable expenditure. If a cheap circulating memory is used as program storage parallel interrogation is impossible.

In the case of the morning and alarm calls it has been found that there is a concentration on the early morning hours. Therefore, it occasionally happens that a new clock pulse arrives from the clock before the interrogation between the time comparison device and the program storage has been terminated.

It is a primary object of the present invention to improve the controlling of an automatic morning and alarm call device in telephone systems in such a way that in the case of a concentration of the call orders at certain times, no such orders are suppressed upon arrival of a new clock pulse, and in spite of this the timely order of sequence of the morning or alarm call orders is maintained.

It is a further object of the invention to improve the control method for an automatic reveille alarm device in telephone systems so that the storing-in facility is seized only for the time necessary to receive the reveille information and that, nevertheless, a cheap rotary memory can be used as program storage.

The controlling method for an automatic morning and alarm call device in telephone systems in which the call information—subscriber's call number and time information—are retained in a central program storage, and the actual morning or alarm calls are initiated via a time comparison device, is characterized in accordance with the present invention, in that the timing pulses of a clock (clock pulses) are fed to a time storage forming part of the time comparison device, via a time-buffer storage, either directly transferring or intermediately storing the clock pulses in dependence upon the idle or busy condition of the time comparison device. The use of a time-buffer storage and its function, depending on the circuit condition of the time comparison device, solves the problem with a minimum of expenditure, without the controlling processes of the automatic morning and alarm call device having to be changed. Since the time comparison device comprises a time storage, which is being stepped-on by the clock pulses, it is only necessary to provide a time-buffer storage which is capable of storing one or more clock pulses. Depending on the chosen timing rhythm, also two clock pulses may occur before the interrogation, which is being performed, has been terminated. But also in cases where a time-buffer storage has to perform the intermediate storage of two clock pulses, the arrangement will still remain simple and easy to survey.

If a special criterion, which is indicative of a certain number of morning or alarm calls, is retained in the program storage then, upon performance of every morning or alarm call intended for this particular subscriber, this special information will be reduced by one. This call order may then be erased upon reaching the information value zero.

Permanent orders can be characterized in this way simply by providing a particular special criterion. The call orders will then be performed or complied with until this call order has been cancelled or erased either by the subscriber or the operator. The storing-in of this erase instruction, and the interrogation of the program storage, may be performed in the manner known per se, and may be initiated via the storing-in device.

At another part of the call information, a special criterion indicates the connecteion of a certain announcing device, so that the morning or alarm call announcement is made in a certain language. In the course of this, and with respect to the controlling arrangement, a simplification can be made if in the case of a missing special criterion at this, preferably the last position of the call information, there is connected a very particular announcement device with a text of the announcement spoken in the language of the country.

The invention will now be explained in detail with reference to basic circuit diagrams showing an automatic morning or alarm call device in a telephone system employing the controls according to the present invention, in which.

By means of a keyboard TP or the subscriber T*ln*–A and the subsequently arranged connection set JU*e*, it is denoted that the storing-in device ES*t* can be seized or occupied by both the operator and the user of the substation T*ln*–A himself. This is initiated in the most simple way by dialling a certain code number. The orders for morning or alarm calls, as existing in the storing-in devices ES*t*, consist of a subscriber's call number, of a time information and of the special criteria. The subscriber's call number may be automatically ascertained via a subscriber identification circuit of t known type. The time information and the special criteria must be fed-in in coded form, with care having to be taken with respect to the order of sequence.

Figure 1:
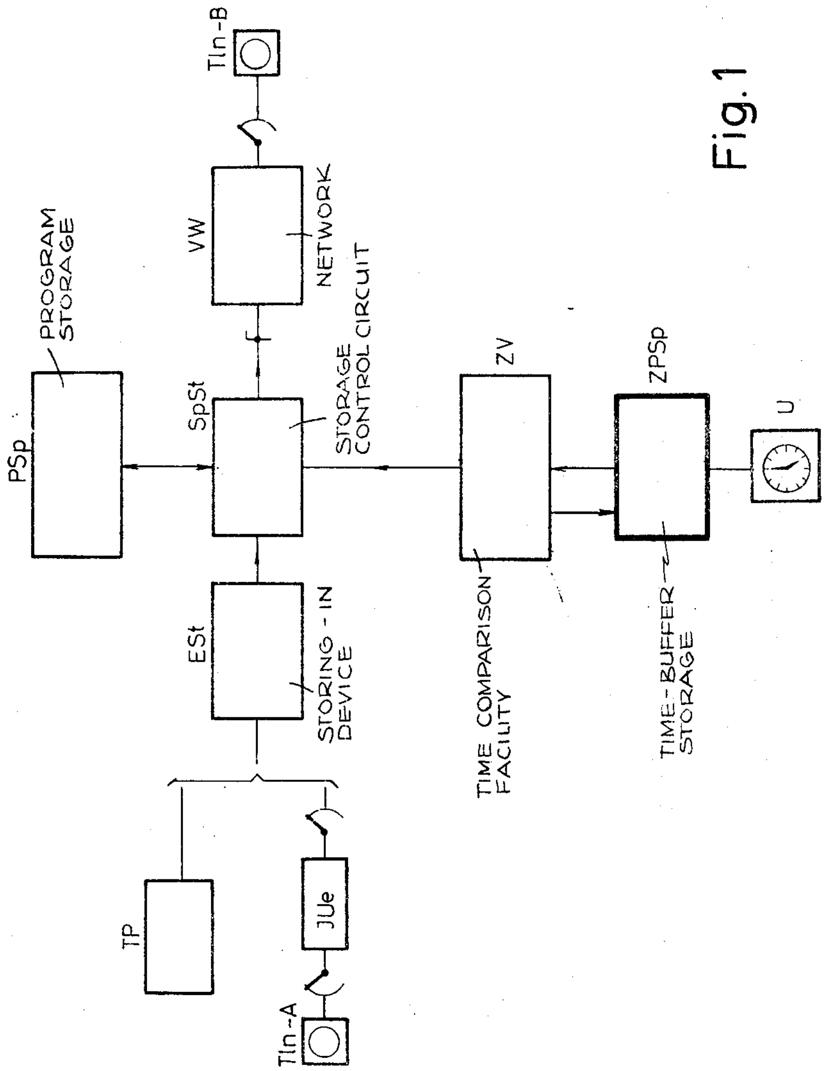
FIG. 1 illustrates a preferred embodiment of the invention.

Upon completion of the morning or alarm call information in the storing-in device ES*t* in FIG. 1, this information is transferred to the program storage PS*p*. This transfer, with the aid of the storage control circuit S*p*S*t*, is only performed if at this time there does not exist an interrogation to be performed between the time comparison device ZV and the program storage PS*p*.

Upon arrival of a new timing pulse from the clock U, this pulse, via the time-buffer storage ZPS*p*, is directly applied to the time comparison device ZV, provided that the latter is not performing an interrogation. This clock pulse effects the stepping-on of the time storage forming part of the time comparison device ZV. The circuit condition of the time storage characterizes a new time information. Now there is initiated a scanning cycle between the time storage and the program storage PS*p*. During this cycle there is performed a check with respect to coincidence of the time information. In the case of time coincidence, the subscriber T*ln*–B as identified in the order for the morning or alarm call, is called in a known manner via the network VW of the system. This scanning cycle extends to all storage sections of the program storage PS*p*, including those storage sections occupied by an order for a morning or alarm call.

If a new timing pulse from the clock U arrives while a scanning cycle is still being performed, and the duration of which owing to the readout, is dependent upon the existence of orders for morning or alarm calls, then this pulse is not transferred to the time comparison device ZV. Since this device is still occupied, there is effected an intermediate storage of the clock pulse in the time-buffer storage ZPS*p*. Upon termination of the performed scanning cycle, the time comparison device ZV becomes free again. The clock pulse which is intermediately stored in the time-buffer storage ZPS*p* is transferred in the course of this to the time comparison device ZV. The time storage is stepped-on and immediately upon termination of the scanning cycle a new scanning cycle is performed with the new time information. In the course of this the time-buffer storage ZPS*p* is erased.

It is within the scope of the present invention that when selecting smaller time intervals between two clock pulses, the storage capacity of the time-buffer storage ZPS*p*, may be extended to several clock pulses.

Figure 2:
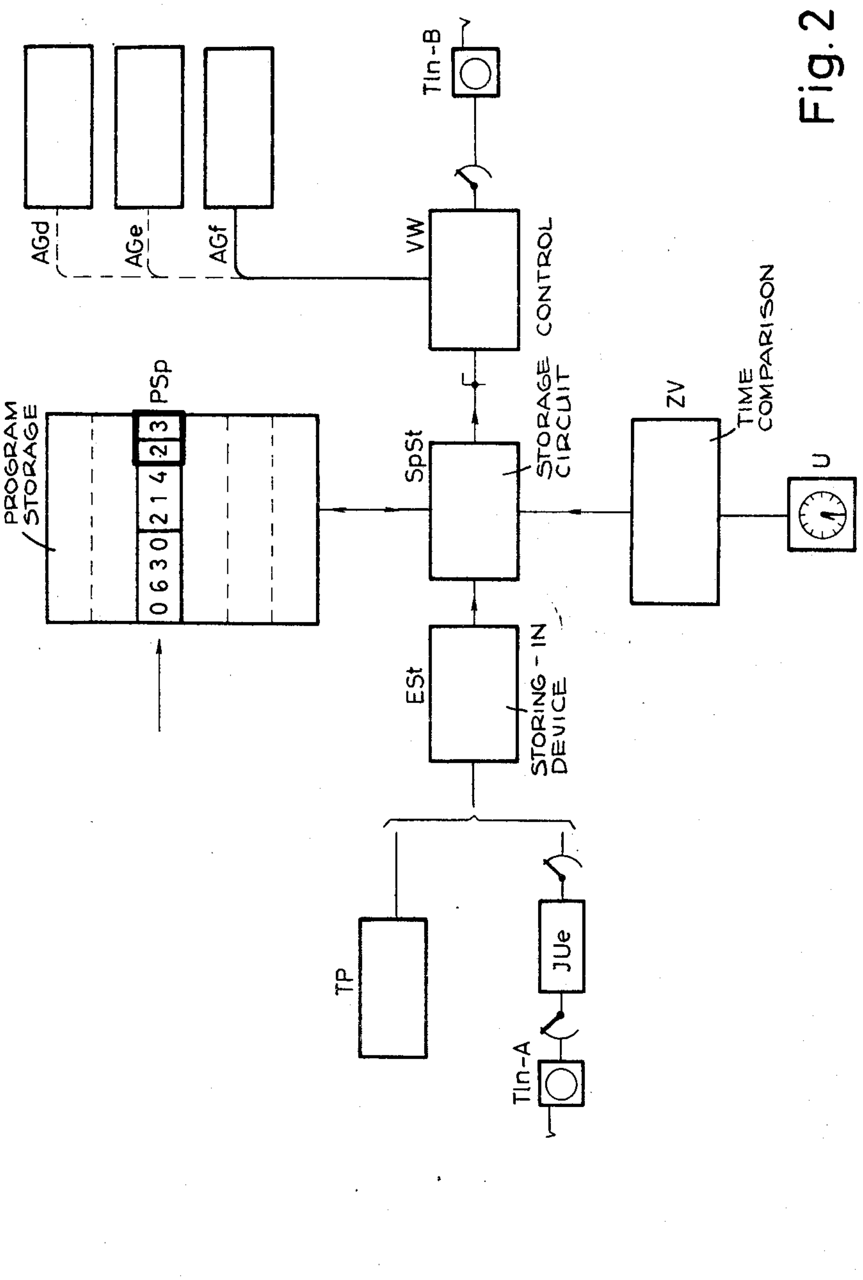
FIG. 2 shows a second embodiment of the invention.

After the call information in the storing-in device ES*t* in FIG. 2 is complete, the call order is taken over by a storage section of the program storage PS*p*. In the filled-in storage row of the program storage PS*p*, there is entered e.g. the call order for the subscriber 214—positions

5 to 7. The information 0630—positions 1 to 4—is indicative of the time at which the morning or alarm call must be initiated. The following position—position 8—of the call information may be indicative of, by way of example, as the number of morning or alarm calls to be made. The information 2, as stored in the predetermined storage cell of the program storage PS*p*, indicates that this call is to be made twice, i.e. at the given time. After each performance of a morning or alarm call, this information is to be reduced by one with the aid of the storage control circuit S*p*S*t*. If, in the course of this process, there is reached the information 0, this particular order for morning or alarm calls may be cancelled or erased via the storage control circuit S*p*S*t*.

If a certain information is stored at this point, e.g. a sign or symbol which is not used for representing the numerical values 1 to 0, then this call order is characterized as a permanent order. Accordingly, the morning or alarm call is made to the particular subscriber every day at the given time. The alarm calls themselves are initiated via the time comparison device ZV which is stepped on by each clock pulse from a clock U and initiates and interrogation with respect to time coincidence by comparing the time information stored in the program storage PS*p*. In the event of a time coincidence, the subscriber T*ln*–B is called via the connecting network VW of the system.

As soon as the subscriber answers the call by lifting his handset, he will receive an announcement from an announcing device. Upon interrogation of the program storage PS*p* and via the last position (position 9) of the call information, in the chosen example the number 3, the announcing device AG*f* is selected for being applied to the connection to be established. In this way the subscriber T*ln*–B will receive the announcement in the language chosen by him.

If this information item forming part of the call information is not being fed-in, then the announcing device AG*d* will be connected automatically in the course of the performance of the morning or alarm call, and the subscriber T*ln*–B is addressed in the language of the respective country.

Figure 3:
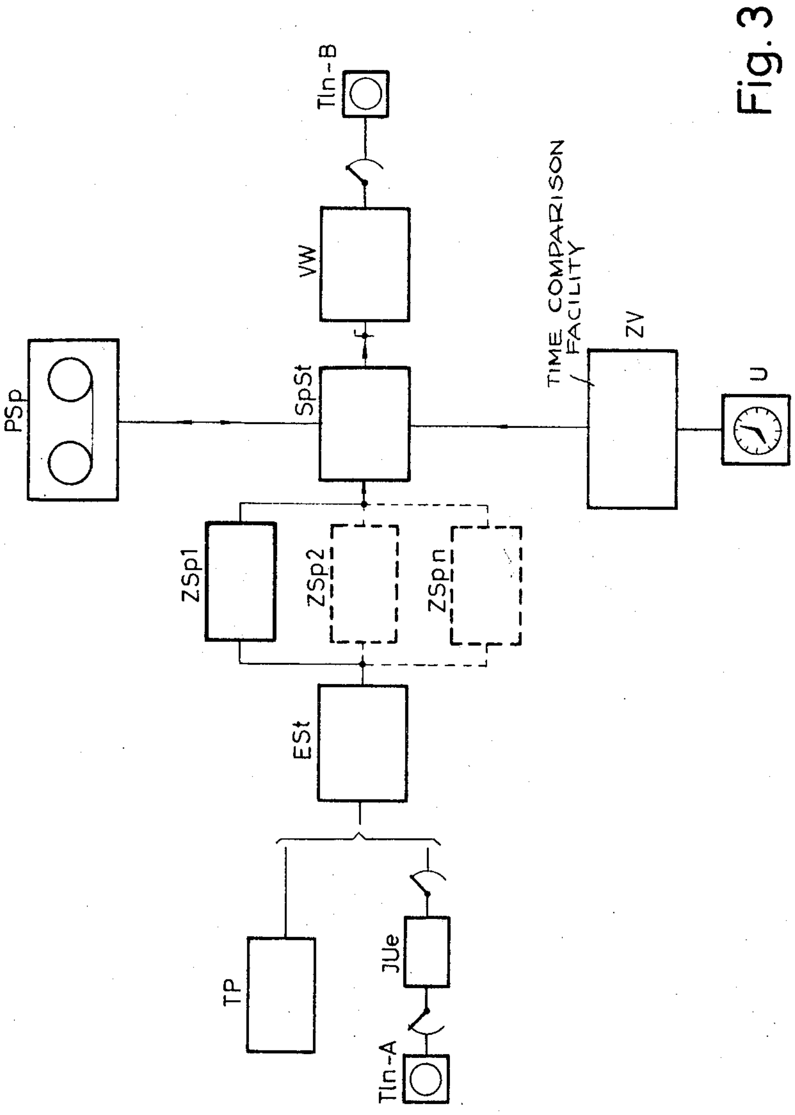
FIG. 3 illustrates yet a third embodiment of the invention.

If the reveille information is completely stored in the storing-in facility ES*t* of FIG. 3 an idle intermediate storage is requested from the intermediate storages ZS*p*1 . . . ZS*pn*, seized and the reveille information deposited there. The storing-in facility ES*t* is again released and is immediately ready to receive new reveille orders.

Taking over the information items from the intermediate storages ZS*p*1 . . . ZS*pn* into the program storage, PS*p* must be tuned to the normal process for initiating reveille alarms. Only then when the time comparing facility ZV does not request and interrogate the program storage PS*p* via the storage control circuit S*p*S*t*, the transfer of the information items should be initiated between program storage PS*p* and intermediate storages ZS*p*1 . . . ZS*pn*. This compulsory run-down can be derived in a simple way via a switching means of the storage control circuit S*p*S*t*.

When taking over the information a separate checking cycle is inserted, e.g. when cancelling an order, for each seized intermediate storage in that the subscriber call number stored in said intermediate storage is compared with the subscriber call numbers being stored in the program storage. If coincidence appears during the comparison, the reveille order given for said subscriber can be cancelled or suitably modified in the program storage. This control can be made by separate special criteria transmitted together with the conventional reveille information. Thus the subscriber has the possibility to cancel or to change his order himself. If the comparison reveals no coincidence the reveille information, stored in the intermediate storage, is entered into an available storage section of the program storage PS*p*. Now a standard type cheap circulating memory can be used as program storage PS$p$, e.g. a conventional magnetic tape. Also a device with an endless tape may be used which makes one full turn at each checking cycle and interrogating cycle. The control can be simplified by known tape starting and blocking signals on the magnetic tape. The magnetic tape device may operate constantly or be started and stopped if required. The time for a checking cycle can now be selected substantially larger, because the storing-in facility ES$t$ is already released again and only a cheap intermediate storage with a small storage capacity remains seized.

When taking over new reveille orders which can be marked in any way known, all seized intermediate storages are interrogated in a checking cycle and the reveille information items stored in said intermediate storages are transferred in two available storage sections of the program storage.

After the program storage PS$p$ has taken over the reveille information, the intermediate storage contents are cancelled and the storage is again available as a buffer element.

This control method does not influence the automatic initiation of the reveille calls by the time comparing facility ZV, because said device has priority to the checking cycles. When the time information in the time comparing facility ZV is changed, being controlled by the clock pulses of a clock U, the program storage PS$p$ is interrogated and the time coincidence is checked. The reveille call connections to the called subscriber T$ln$–B are established in a way known via the telephone network VW. It should be considered only that during said period the checking cycles for entering or cancelling of reveille orders in the program storage are prevented.

While the principles of the invention have been described above in connection with specific apparatus and applications, it is to be understood that this description is made only by way of example and not as a limitation on the scope of the invention.

What is claimed is:

1. A control system for an automatic morning and alarm call device in telephone systems comprising:

a subscriber station, a storage facility connectable to the subscriber station to receive and store a memory of dial pulses representing a subscriber's call number and time information, said storage facility incorporating a plurality of interconnected parts including a storing-in device, a storage control circuit and a program storage device, means in said storing-in device for receiving call information, including the subscriber's call number and time information, means in said program storage device for storing said call information, means for automatically initiating alarm calls via the time comparison device, special storage sections in said program storage device for receiving and storing special criteria controlling the number of morning or alarm calls to be made in response to said alarm calls as well as designations of message format, a plurality of announcing devices provided to make announcements in different languages in accordance with designations of message format, a clock facility for providing signals in the form of pulses indicating the time of day, and a time comparison facility connected to said clock facility and to said storage facility for receiving and comparing the time information in the memory of the storage facility with the pulses indicating time of day to determine when a subscriber should be called.

2. A control system as claimed in claim 1, further comprising:

means associated with the program storage for reducing the information determinative of the number of calls to be made by one each time a message is delivered.

3. A control system as claimed in claim 1, further comprising:

means for erasing the respective call order upon the information determinative of the number of calls reaching zero.

4. A control system for an automatic morning and alarm call device in telephone systems comprising:

a subscriber station, a storage facility connectable to the subscriber station to receive and store a memory of dial pulses representing a subscriber's call number and time information, said storage facility incorporating a plurality of interconnected parts including a storing-in device, a storage control circuit and a program storage device, a plurality of intermediate storages associated with the storage facility and connected between the storing-in device and the storage control circuit, said program storage device including a circulating memory, said storage control circuit permitting the transfer of information from the intermediate storages to the circulating memory in a cycle determined by the program storage and the kind of order received, a clock facility for providing signals in the form of pulses indicating the time of day, and a time comparison facility connected to said clock facility and to said storage facility for receiving and comparing the time information in the memory of the storage facility with the pulses indicating time of day to determine when a subscriber should be called.

5. A control system as claimed in claim 4, further comprising:

a magnetic tape device associated with the circulating memory.

References Cited

UNITED STATES PATENTS

| | | | |
|---|---|---|---|
| 584,173 | 6/1897 | Chance | 179—2 |
| 1,227,523 | 5/1917 | Blessing | 179—2 |
| 1,302,767 | 5/1919 | Clausen et al. | 179—6 |
| 2,483,214 | 9/1949 | Lomax | 179—2 |
| 2,856,461 | 10/1958 | Beilfuss | 179—2 |
| 2,901,542 | 8/1959 | Henches et al. | 179—6 |
| 3,046,339 | 7/1962 | Breen et al. | 179—2 |

FOREIGN PATENTS

| | | |
|---|---|---|
| 1,096,429 | 1/1961 | Germany. |
| 915,212 | 1/1963 | Great Britain. |

KATHLEEN H. CLAFFY, Primary Examiner

A. B. KIMBALL, JR., Assistant Examiner

U.S. Cl. X.R.

179—5.5, 6